United States Patent Office 3,200,133
Patented Aug. 10, 1965

1

3,200,133
17-OXYGENATED ANDROST-2-EN-19-OLS AND ESTERS THEREOF
Raymond E. Counsell, Skokie, and Paul D. Klimstra, Northbrook, Ill., assignors to G. D. Searle & Co., Chicago, Ill., a corporation of Delaware
No Drawing. Filed Sept. 12, 1963, Ser. No. 308,341
13 Claims. (Cl. 260—397.4)

The present invention relates to 19-oxygenated androstane derivatives and especially to 17-oxygenated androst-2-en-19-ols and the esters derived therefrom, the compounds contemplated being illustrated by the following structural representation

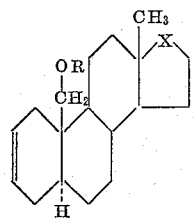

wherein R is hydrogen or a

radical, and X is a carbonyl or

radical in which Z can be hydrogen or a lower aliphatic hydrocarbon radical, and Y is hydrogen when Z is a lower aliphatic hydrocarbon radical, but Y may be either hydrogen or a

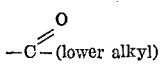

radical when Z is hydrogen.

The lower aliphatic hydrocarbon radicals symbolized by Z in the foregoing representation are the lower alkyl, alkenyl, and alkynyl groups represented by the formulas $C_nH_{2n+1}$
$C_nH_{2n-1}$
$C_nH_{2n-3}$ respectively, in which $n$ is a positive integer less than 8. Those groups are exemplified by methyl, ethyl, isopropyl, secondary-butyl, pentyl, tertiary-hexyl, heptyl, vinyl, allyl, propenyl, crotyl, isobutenyl, pentenyl, hexenyl, heptenyl, ethynyl, propynyl, propargyl, butynyl, pentynyl, hexynyl, and heptynyl. The lower alkyl groups contemplated in the Y term are likewise typified by the aforementioned alkyl radicals.

The compounds of the present invention are conveniently produced from starting materials of the structural formulas

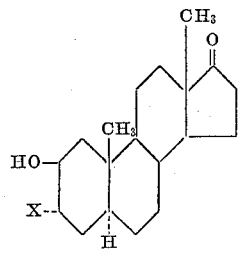

and

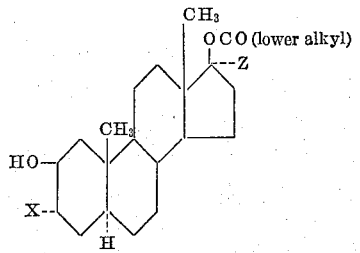

wherein X is a halogen of atomic weight less than 100, i.e., fluorine, chlorine, or bromine, and Z is hydrogen or a lower aliphatic hydrocarbon radical. As is described in our copending application Serial No. 293,839, filed July 9, 1963, oxidation of the latter halohydrins with a suitable reagent results in the corresponding 2β,19-epoxy derivatives. A preferred process is illustrated by the reaction of 3α-bromo-2β-hydroxy-5α-androstan-17-one in carbon tetrachloride with lead tetraacetate and iodine to produce 3α-bromo-2β,19-epoxy-5α-androstan-17-one.

The aforementioned 2β,19-epoxy intermediates are converted to the instant 19-acetoxyandrost-2-enes by a process involving the use of zinc in an acetic acid medium. That process is preferably conducted at the reflux temperature of the reaction mixture for a period of several hours. As a specific example of the process contemplated, a solution of 3α-bromo-2β,19-epoxy-5α-androstan-17-one in acetic acid is heated at the reflux temperature with zinc dust to yield 19-acetoxy-5α-androst-2-en-17-one.

Reduction of the instant 17-keto compounds provides an alternate route to the 17-hydroxy compounds of the present invention. The aforementioned 19-acetoxy-5α-androst-2-en-17-one, for example, is contacted with lithium tri-(tertiary-butoxy) aluminum hydride in tetrahydrofuran at 0–5° to afford 5α-androst-2-ene-17β,19-diol 19-acetate.

Saponification of the aforementioned 19-acetoxy derivatives affords a convenient route to the instant 19-hydroxy compounds. 5α-androst-2-ene-17β,19-diol 19-acetate, for example, is heated under reflux with potassium hydroxide in aqueous methanol to afford 5α-androst-2-ene-17β,19-diol.

Acylation of the corresponding hydroxy compounds with a lower alkanoic acid halide or anhydride, preferably in the presence of a suitable acid acceptor, affords the lower alkanoyloxy compounds of this invention. This process is specifically illustrated by the reaction with acetic anhydride and pyridine of 19-hydroxy-5α-androst-2-ene-17-one, 5α-androst-2-ene-17β,19-diol 19-acetate, or 17α-methyl-5α-androst-2-ene-17β,19-diol to afford 19-acetoxy-5α-androst-2-en-17-one, 5α-androst-2-ene-17β,19-diol 17,19-diacetate, and 17α-methyl-5α-androst-2-ene-17β,19-diol 19-acetate, respectively.

The 17-(lower aliphatic hydrocarbon)-17β-ols of the present invention are derived from the instant 17-keto compounds by reaction with the appropriate organometallic reagent. An example of the preparation of a 17α-(lower alkyl)-17β-ol is the reaction of 19-hydroxy-5α-androst-2-en-17-one with methyl magnesium bromide in n-butyl ether containing tetrahydrofuran to yield 17α-methyl-5α-androst-2-ene-17β,19-diol. The production of a 17α-(lower alkynyl)-17β-ol is exemplified by the reaction of 19-acetoxy-5α-androst-2-en-17-one with lithium acetylide in the form of its ethylene diamine complex to afford 17α-ethynyl-5α-androst-2-ene-17β,19-diol.

An alternate procedure for the manufacture of the instant 17α-(lower alkenyl)-17β-ols involves partial reduction of the corresponding 17α-(lower alkynyl)-17β-ols. Thus, the aforementioned 17α-ethynyl-5α-androst-2-ene-17β,19-diol is catalytically hydrogenated in pyridine, utilizing 5% palladium-on-carbon catalyst, to afford 17α-vinyl-5α-androst-2-ene-17β,19-diol.

The compounds of this invention display valuable pharmacological properties. They are, for example, hormonal and anti-hormonal agents as is evidenced by their anabolic, androgenic, anti-inflammatory, and anti-estrogenic properties. In addition, they possess hypocholesterolemic activity in view of their ability to reduce the blood plasma cholesterol concentration.

The invention will appear more fully from the examples which follow. These examples are set forth by way of illustration only, and it will be understood that the invention is not to be construed as limited either in spirit or in scope by the details contained therein as many modifications in materials and methods will be apparent from this disclosure to those skilled in the art. In these examples, temperatures are given in degrees centigrade (° C.) and quantities of materials in parts by weight unless otherwise noted.

*Example 1*

To a solution of 18.5 parts of 3α-bromo-2β-hydroxy-5α-androstan-17-one in 1600 parts of carbon tetrachloride is added 67 parts of lead tetraacetate and 25.4 parts of iodine, and the resulting reaction mixture is heated at the reflux temperature for about 8 hours, then is allowed to stand at room temperature for about 16 hours. The mixture is filtered, and the filter cake is washed with methylene chloride. This organic solution is washed successively with 10% aqueous sodium thiosulfate and water, then is dried over anhydrous sodium sulfate and stripped of solvent at reduced pressure. The residue is dissolved in a 1:1 hexane-benzene solution, then is chromatographed on a silica gel column. The column is eluted, first with benzene then with benzene containing increasing amounts of ethyl acetate. The 5% ethyl acetate in benzene eluate affords a fraction which, after recrystallization from methanol, results in 3α-bromo-2β,19-epoxy-5α-androstan-17-one, melting at about 130–132°. It displays an optical rotation of +87° in chloroform.

*Example 2*

To a solution of 50 parts of 3α-bromo-2β,19-epoxy-5α-androstan-17-one in 525 parts of acetic acid is added 50 parts of zinc dust, and the resulting reaction mixture is heated at the reflux temperature with stirring for about 7 hours, then is allowed to cool to room temperature. The inorganic salts are removed by filtration and washed on the filter with isopropyl alcohol. The filtrate is poured slowly into approximately 3000 parts of cold water, and the resulting reaction mixture is stored at 0–5° for about 16 hours. The precipitated solid is collected by filtration, washed on the filter with water, and dried in air to yield crude 19-acetoxy-5α-androst-2-en-17-one, melting at about 71–72°. Recrystallization of that product from aqueous methanol affords needle-like crystals of the pure substance, melting at about 72–74°. This compound is characterized by an optical rotation of +107.5° in chloroform and also by the structural formula

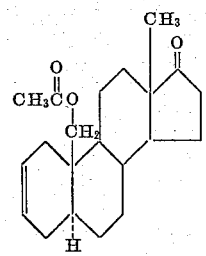

*Example 3*

A mixture of 5 parts of 19-acetoxy-5α-androst-2-en-17-one, 15 parts of lithium tri-(tertiary-butoxy) aluminum hydride, and 135 parts of tetrahydrofuran is stirred at 0–5° for about 90 minutes, then is poured into cold 10% aqueous acetic acid. The oily layer which initially separates becomes solid upon cooling, and that precipitate is collected by filtration, washed on the filter with water, and dried in air. The crude product thus obtained is recrystallized from aqueous methanol to afford pure 5α-androst-2-ene-17β,19-diol 19-acetate, melting at about 86–88°. It displays an optical rotation of +43.5° in chloroform and is represented by the structural formula

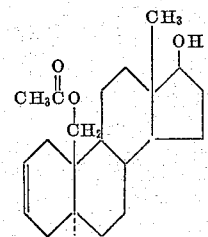

*Example 4*

To a solution of 4 parts of 19-acetoxy-5α-androst-2-en-17-one in 38 parts of methanol containing 2 parts of water is added one part of potassium hydroxide, and the resulting reaction mixture is heated at the reflux temperature for about 3 hours, then is allowed to stand at room temperature for about 16 hours. Dilution of this mixture with cold water followed by cooling at 0–5° for about 30 minutes results in precipitation of the crude product which is collected by filtration, washed on the filter with water, and dried in air. Recrystallization of that crude product from acetone-hexane affords pure 19-hydroxy-5α-androst-2-en-17-one, melting at about 138–140° and displaying an optical rotation of +152.5° in chloroform. This compound is represented by the structural formula

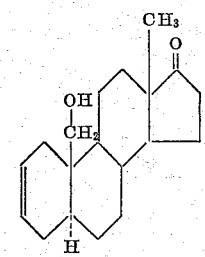

*Example 5*

To a solution of 3 parts of 5α-androst-2-ene-17β,19-diol 19-acetate in 80 parts of methanol is added a solution of 5 parts of potassium hydroxide in 40 parts of water, and the resulting reaction mixture is heated at the reflux temperature for about 90 minutes, then is filtered while still hot and poured slowly into water. The precipitate which forms is collected by filtration, washed on the filter with water, and dried in air to afford 5α-androst-2-ene-17β,19-diol. Recrystallization of that material from acetone-hexane affords the pure substance, melting at about 152–152.5° and characterized further by an optical rotation of +76° in chloroform. This compound is represented by the structural formula

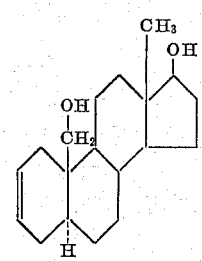

*Example 6*

To 23 parts of a refluxing solution of 3 Molar methyl magnesium bromide in n-butyl ether, diluted with 45 parts of tetrahydrofuran, is added dropwise, with stirring in an atmosphere of nitrogen, a solution of 1.45 parts of 19-hydroxy-5α-androst-2-en-17-one in 27 parts of tetrahydrofuran. The addition vessel is rinsed with 18 parts of tetrahydrofuran, and that solution is added to the reaction mixture. After the addition is complete, the reaction mixture is heated at the reflux temperature with stirring for about 7 hours, then is kept at room temperature for about 16 hours. At that point, the mixture is cooled to 0–5°, and approximately 50 parts by volume of 10% aqueous ammonium chloride is added dropwise with stirring. To that mixture is added 70 parts of ether, and the organic layer is separated, washed successively with dilute hydrochloric acid and water, dried over anhydrous sodium sulfate containing decolorizing carbon and stripped of solvent at reduced pressure. The residual solid is recrystallized from ethyl acetate to afford pure 17α-methyl-5α-androst-2-ene-17β,19-diol, melting at about 165–166°. It displays an optical rotation of +26.3° in chloroform and is further characterized by the structural formula

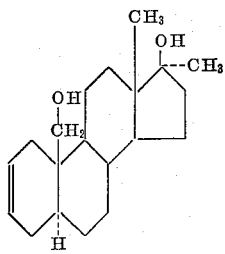

*Example 7*

The substitution of an equivalent quantity of ethyl magnesium bromide in the procedure described in Example 6 results in 17α-ethyl-5α-androst-2-ene-17β,19-diol of the structural formula

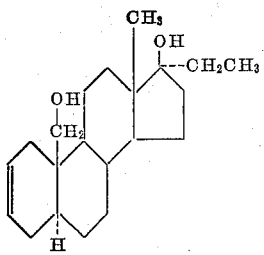

*Example 8*

To a solution of 5.5 parts of the 30% lithium acetylide–70% ethylene diamine complex in 31.5 parts of tetrahydrofuran is added a solution of 2 parts of 19-acetoxy-5α-androst-2-en-17-one in 31.5 parts of tetrahydrofuran over a period of about 3 minutes. An additional 18 parts of tetrahydrofuran is added, and that reaction mixture is stirred at room temperature for about 2¼ hours. At the end of that time, the mixture is poured into cold aqueous ammonium chloride, then is acidified by the addition of hydrochloric acid. The product separates as an oil and is extracted into ether, and the resulting ether solution is washed successively with water, 5% aqueous sodium bicarbonate and water, then dried over anhydrous sodium sulfate containing decolorizing carbon and stripped of solvent at reduced pressure. The resulting oily residue is crystallized from aqueous methanol to afford hydrated 17α-ethynyl-5α-androst-2-ene-17β,19-diol, melting at about 75–78°. Drying of this material affords the anhydrous substance as a glass. It displays an optical rotation of +21.5° in chloroform and is represented by the structural formula

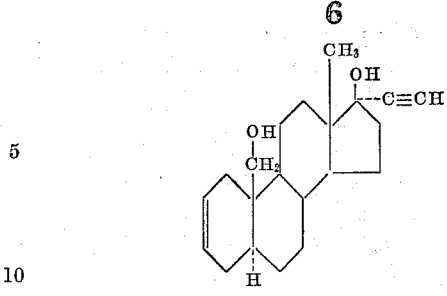

*Example 9*

A solution of 6 parts of 1-butyne in 40 parts of cold ether is added portionwise, in the course of about 30 minutes, to a solution of butyllithium, which is prepared from 17.3 parts of 1-bromobutane and 2.2 parts of lithium wire in 27 parts of ether. After completion of the addition, the mixture is stirred for about 90 minutes at about 0°. To that ethereal solution of butynyl lithium is then added, over a period of about 30 minutes, a solution of 11.6 parts of 19-acetoxy-5α-androst-2-en-17-one in 100 parts of tetrahydrofuran. After completion of the addition, the ether is removed by distillation, keeping the volume essentially constant by the addition of tetrahydrofuran. That mixture is then heated at the reflux temperature for about 3 hours, following which period of time it is poured into water, and the aqueous mixture which results is cooled at 0–5° The oily layer which separates is extracted into ether, and that organic solution is washed successively with water and saturated aqueous sodium chloride, then is dried over anhydrous sodium sulfate, and is concentrated to dryness under reduced pressure to afford 17α-(1-butynyl)-5α-androst-2-ene-17β,19-diol of the structural formula

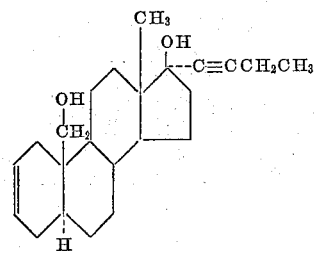

*Example 10*

To a solution of 7.1 parts of 17α-ethynyl-5α-androst-2-ene-17β,19-diol in 1000 parts of pyridine is added 0.7 part of 5% palladium-on-carbon catalyst, and that reaction mixture is shaken in a hydrogen atmosphere at atmospheric pressure and room temperature until one molecular equivalent of hydrogen is absorbed. The catalyst is removed by filtration and the solvent by distillation at reduced pressure, resulting in an oily residue which solidifies on standing. Crystallization of that solid from aqueous methanol affords pure 17α-vinyl-5α-androst-2-ene-17β,19-diol, melting at about 139–141°. It is characterized further by an optical rotation of +58.5° in chloroform and, in addition, by the structural formula

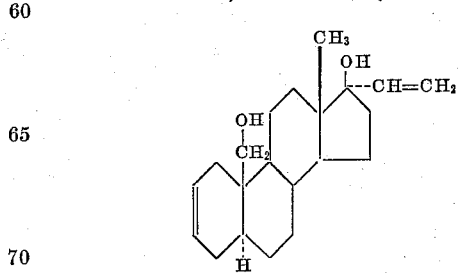

*Example 11*

By substituting 7.7 parts of 17α(1-butylnyl)-5α-androst-2-ene-17β,19-diol and otherwise proceeding according to the processes described in Example 10, 17α-(1-butenyl)-5α-androst-2-ene-17β,19-diol is obtained. It is represented by the structural formula

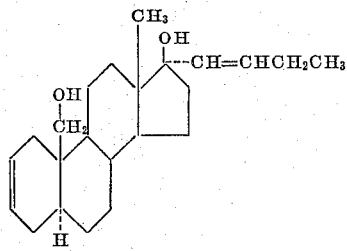

*Example 12*

A mixture of 7.5 parts of 5α-androst-2-ene-17β,19-diol 19-acetate, 50 parts of acetic anhydride, and 100 parts of pyridine is kept at room temperature for about 16 hours, then is poured into a mixture of ice and water. The precipitate which forms is collected by filtration, washed on the filter with water, and dried in air to afford crude 5α-androst-2-ene-17β,19-diol 17,19-diacetate. Recrystallization from methanol affords white needle-like crystals of the pure material, melting at about 138–140°. This compound is represented by the structural formula

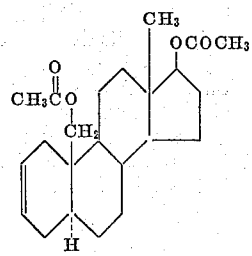

*Example 13*

The reaction of 63.7 parts of propionic anhydride with 6.55 parts of 5α-androst-2-ene-17β,19-diol according to the procedure of Example 12 results in 5α-androst-2-ene-17β,19-diol 17,19-dipropionate of the structural formula

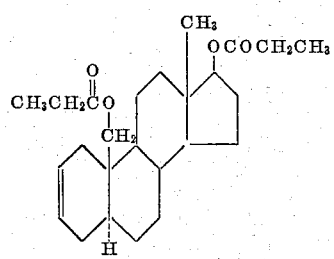

*Example 14*

The reaction of 6.9 parts of 17α-methyl-5α-androst-2-ene-17β,19-diol with acetic anhydride according to the procedure described in Example 12 results in 17α-methyl-5α-androst-2-ene-17β,19-diol 19-acetate, represented by the structural formula

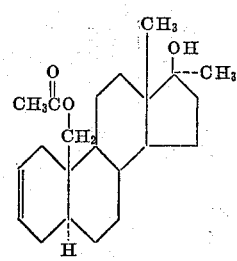

*Example 15*

When 7.1 parts of 17α-ethynyl-5α-androst-2-ene-17β,19-diol is acylated with acetic anhydride by the processes described in Example 12, 17α-ethynyl-5α-androst-2-ene-17β,19-diol 19-acetate is obtained. It can be represented by the structural formula

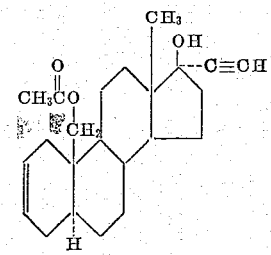

EXAMPLE *16*

By substituting 7.2 parts of 17α-vinyl-5α-androst-2-ene-17β,19-diol and otherwise proceeding according to the process described in Example 12, 17α-vinyl-5α-androst-2-ene-17β,19-diol 19-acetate, characterized by the structural formula

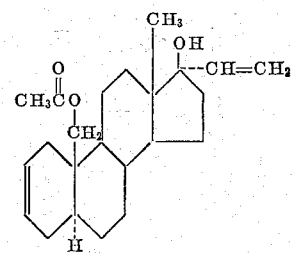

is obtained.

*Example 17*

A mixture of one part of 19-hydroxy-5α-androst-2-ene-17-one, 13 parts of propionic anhydride, and 20 parts of pyridine is allowed to stand at room temperature for about 16 hours, then is poured into cold water. The resulting aqueous mixture is extracted with ether, and the ether solution is washed successively with dilute hydrochloric acid and water, then is dried over anhydrous sodium sulfate and concentrated to dryness at reduced pressure to afford 19-propionoxy-5α-androst-2-en-17-one of the structural formula

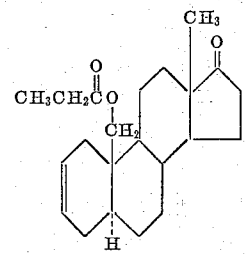

*Example 18*

When 5.2 parts of 19-propionoxy-5α-androst-2-en-17-one is reduced by the procedure described in Example 3, 5α-androst-2-ene-17β,19-diol 19-propionate is obtained. It can be represented by the structural formula

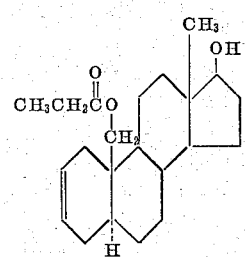

What is claimed is:
1. A compound of the formula

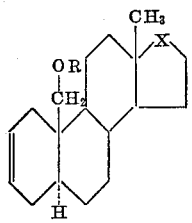

wherein X is a radical selected from the group consisting of carbonyl and

Z being a member of the class consisting of hydrogen and a lower aliphatic hydrocarbon radical, Y being hydrogen when Z is a lower aliphatic hydrocarbon radical, Y being a member of the class consisting of hydrogen and

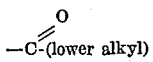

radicals when Z is hydrogen, and R is selected from the group consisting of hydrogen and

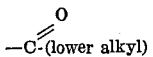

radicals.

2. 19-hydroxy-5α-androst-2-en-17-one.
3. 5α-androst-2-ene-17β,19-diol.
4. A compound of the formula

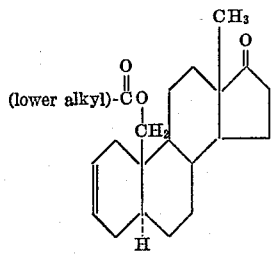

5. 19-acetoxy-5α-androst-2-en-17-one.

6. A compound of the formula

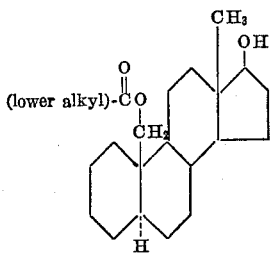

7. 5α-androst-2-ene-17β,19-diol 19-acetate.
8. A compound of the formula

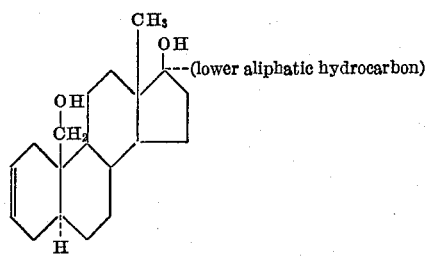

9. 17α-ethynyl-5α-androst-2-ene-17β,19-diol.
10. 17α-methyl-5α-androst-2-ene-17β,19-diol.
11. 17α-vinyl-5α-androst-2-ene-17β,19-diol.
12. A compound of the formula

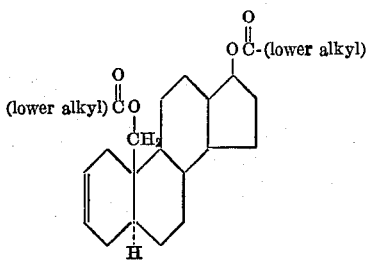

13. 5α-androst-2-ene-17β,19-diol 17,19-diacetate.

No references cited.

LEWIS GOTTS, *Primary Examiner.*

UNITED STATES PATENT OFFICE
CERTIFICATE OF CORRECTION

Patent No. 3,200,133                          August 10, 1965

Raymond E. Counsell et al.

It is hereby certified that error appears in the above numbered patent requiring correction and that the said Letters Patent should read as corrected below.

Column 1, lines 25 to 27, the formula should appear as shown below instead of as in the patent:

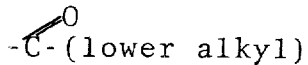

column 6, line 74, for "17α (1-butylnyl)-" read -- 17α-(1-butynyl)- --; column 10, lines 1 to 12, the lower left-hand portion of the formula should appear as shown below instead of as in the patent:

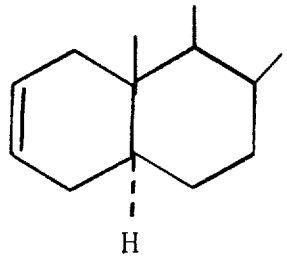

Signed and sealed this 5th day of July 1966.

(SEAL)
Attest:

ERNEST W. SWIDER                                EDWARD J. BRENNER
Attesting Officer                             Commissioner of Patents